March 20, 1956     H. WENGER     2,738,900
CANISTER WITH SCOOP FASTENING MEANS
Filed Feb. 24, 1954
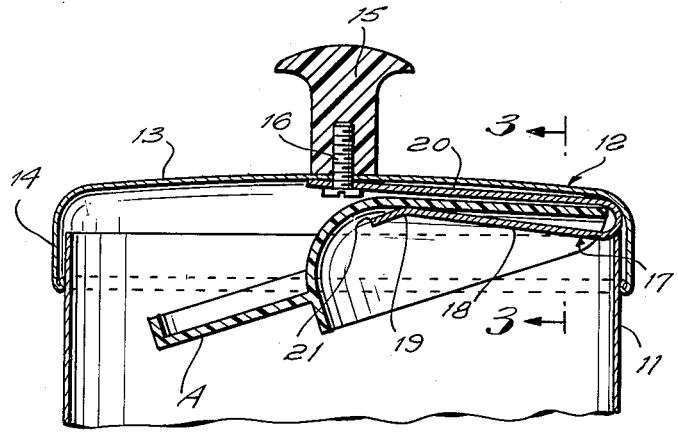
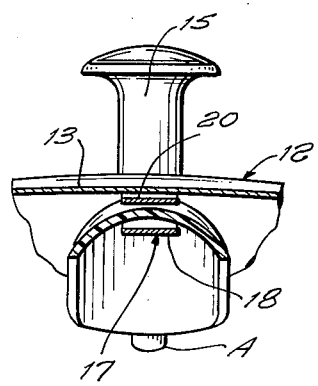
FIG.3.
FIG.1.
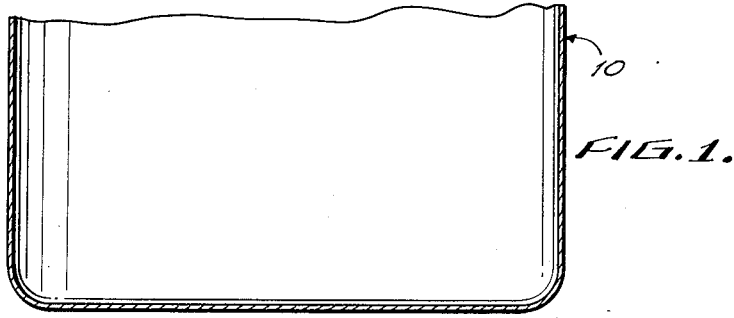
FIG.2.
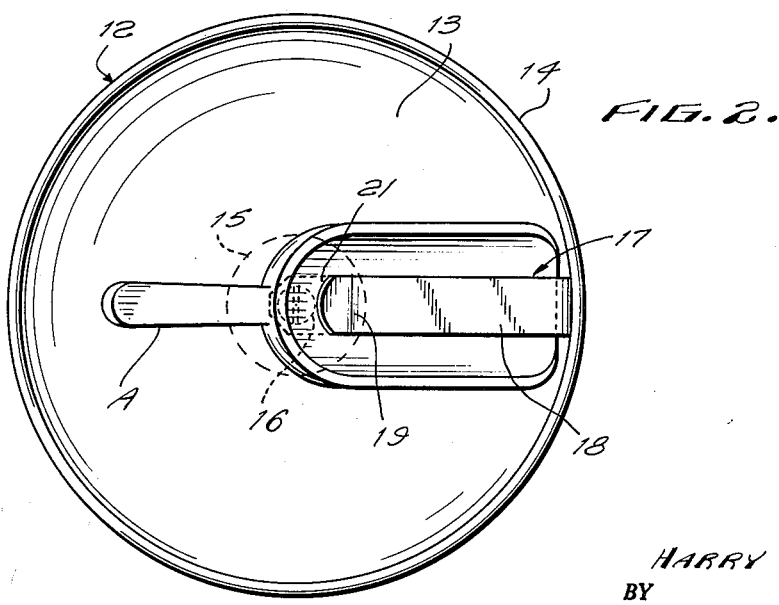
INVENTOR.
HARRY WENGER
BY
*Clark & Ott*
ATTORNEYS ically of the top wall of the lid, said spring
United States Patent Office 2,738,900
Patented Mar. 20, 1956

2,738,900

CANISTER WITH SCOOP FASTENING MEANS

Harry Wenger, New York, N. Y.

Application February 24, 1954, Serial No. 412,319

2 Claims. (Cl. 222—114)

This invention relates to canisters for containing food products in a pure and sterile condition and which permits of the convenient dispensing of measured quantities thereof for use as required in baking and cooking.

The invention has particular reference to the provision of a scoop for each canister and to means for releasably fastening the scoop thereto for disposing the same in convenient position for use and to avoid possible loss thereof.

An object of the invention is to provide a canister having a spring affixed to the lid thereof for receiving and holding a scoop in association therewith.

Another object of the invention is to provide a canister of said character in which the spring is affixed to the under side of the lid by means which secures the handle knob to the lid.

Still another object of the invention is to provide a spring of said character having an opening located centrally of the lid in which the scoop is inserted for retaining the same in association with the canister.

With the foregoing and other objects in view, reference is now made to the following specification and accompanying drawings in which the preferred embodiment of the invention is illustrated.

In the drawings:

Fig. 1 is a vertical sectional view of a canister provided with a spring constructed in accordance with the invention for fastening a scoop to the lid of the canister.

Fig. 2 is an underside view of the lid.

Fig. 3 is a fragmentary sectional view taken approximately on line 3—3 of Fig. 1.

Referring to the drawings, the canister 10 may be of any desired shape or configuration and the same may be of metal or earthenware or other suitable material. The canister includes a container 11 and a lid 12 which fittingly engages the top of the container to prevent the entry of dust and the like for maintaining the food products contained therein in a pure and sterile condition. As illustrated, the lid is formed with a top wall 13 and a marginal flange 14 which slidably fits the top of the container 11. The lid is provided with a knob 15 secured to the top wall thereof by a threaded stud 16.

In order to removably mount a scoop on the canister so that it is in a position for convenient use when desired for scooping out the food products, a spring 17 is provided which is affixed to the under side of the top wall of the lid. The spring is fashioned from a length of flat spring stock which is bent into general U-shaped formation and with a side portion 18 thereof bent inwardly at 19 towards the other side portion 20 to provide a narrow space therebetween. The free end of the side portion 18 extends outwardly to form an enlarged mouth 21 which opens into the said narrow space between the opposite sides of the spring. The side portion 20 of the spring is affixed to the under side of the top wall of the lid by means of the stud 16 which extends through an opening therein with the head of the stud 16 tightened against the spring. The mouth 21 of the spring is thus located substantially centrally of the lid whereby a scoop indicated by the reference character A may be inserted in the spring between the side portions 18 and 20 thereof to dispose the scoop in inverted position with the handle thereof projecting beyond the flange of the lid and in convenient position for grasping the scoop to remove the same from the spring. Constructed in this manner, the scoop may be readily supported on the lid of a canister in a convenient position for removing the same therefrom when the food products contained in the canister are to be removed.

While the preferred embodiment of the invention is illustrated herein, it is to be understood that the same is not so limited and shall cover and include any and all modifications thereof which fall within the scope of the claims.

What is claimed is:

1. In a canister, in combination, a container portion having an open top, a lid including a top wall and a marginal flange fitting the open top of the container, a spring of general U-shaped formation affixed to the underside of the lid within the confines of the marginal flange, said U-shaped spring including upper and lower leg portions disposed substantially parallel with the top wall of the lid and being connected together by a bend located adjacent the marginal flange and said leg portions being spaced apart at their free ends, said free ends being located substantially medially of the top wall of the lid, said spring extending from said bend to said free ends, and a scoop having an elongated, substantially straight bottom portion resiliently and detachably held between and lengthwise of said leg portions and extending substantially the full length of said spring.

2. In a canister, in combination, a container portion having an open top, a lid including a top wall and a marginal flange fitting the open top of the container, a spring of general U-shaped formation affixed to the underside of the lid within the confines of the marginal flange, said U-shaped spring including upper and lower leg portions disposed substantially parallel with the top wall of the lid and being connected together by a bend located adjacent the marginal flange and said leg portions being spaced apart at their free ends, said free ends being located substantially medially of the top wall of the lid, said spring extending from said bend to said free ends, and a scoop having an elongated, substantially straight bottom portion resiliently and detachably held between and lengthwise of said leg portions, said scoop having a handle portion extending outside the confines of said marginal flange, to permit easy removal and re-engagement of said scoop from and with said spring.

References Cited in the file of this patent

UNITED STATES PATENTS

| 361,153 | Finks | Apr. 12, 1887 |
| 1,212,185 | Cobb | Jan. 16, 1917 |
| 1,368,868 | Wertman | Feb. 15, 1921 |

FOREIGN PATENTS

| 109,845 | Great Britain | Sept. 28, 1917 |